United States Patent
Furuichi et al.

(10) Patent No.: US 8,845,111 B2
(45) Date of Patent: Sep. 30, 2014

(54) LENS SHIFTING DEVICE AND PROJECTION DISPLAY DEVICE INCLUDING THE SAME

(75) Inventors: Kunitaka Furuichi, Tokyo (JP); Takayuki Okada, Tokyo (JP)

(73) Assignee: NEC Display Solutions, Ltd., Tokyo (JP)

(*) Notice: Subject to any disclaimer, the term of this patent is extended or adjusted under 35 U.S.C. 154(b) by 126 days.

(21) Appl. No.: 13/576,382

(22) PCT Filed: Mar. 2, 2010

(86) PCT No.: PCT/JP2010/053332
§ 371 (c)(1),
(2), (4) Date: Jul. 31, 2012

(87) PCT Pub. No.: WO2011/108074
PCT Pub. Date: Sep. 9, 2011

(65) Prior Publication Data
US 2012/0293778 A1 Nov. 22, 2012

(51) Int. Cl.
*G03B 21/14* (2006.01)
*G03B 5/04* (2006.01)

(52) U.S. Cl.
CPC ............... *G03B 5/04* (2013.01); *G03B 21/147* (2013.01); *G03B 21/145* (2013.01)
USPC ................. 353/101; 353/30; 353/38; 353/85; 353/88; 353/100; 362/285; 362/287

(58) Field of Classification Search
CPC ........ G03B 21/14; G03B 27/62; G03B 7/023; H04N 9/317; H04N 9/3141; H04N 9/3197; H04N 9/3185; H04N 9/3194; F21V 29/02; G02F 1/133526
USPC .......... 353/30, 38, 85, 88, 100, 101; 362/218, 362/285, 287, 345, 373; 348/743–747; 349/5, 7–9
See application file for complete search history.

(56) References Cited

U.S. PATENT DOCUMENTS

| 6,547,402 | B2 | 4/2003 | Masuda |
| 7,055,971 | B2 | 6/2006 | Gishi |

(Continued)

FOREIGN PATENT DOCUMENTS

| JP | 05-080239 A | 4/1993 |
| JP | 08-195923 A | 7/1996 |
| JP | 2002-365725 A | 12/2002 |
| JP | 2003-315916 A | 11/2003 |
| JP | 2004-020886 A | 1/2004 |
| JP | 2005-049680 A | 2/2005 |
| JP | 2005-055644 A | 3/2005 |
| JP | 2005-195702 A | 7/2005 |
| JP | 2006-301424 A | 11/2006 |
| JP | 2007-033591 A | 2/2007 |
| JP | 2008-139698 A | 6/2008 |
| JP | 2008-287292 A | 11/2008 |
| JP | 2009-175353 A | 8/2009 |

OTHER PUBLICATIONS

International Search Report n. PCT/JP2010/053332 dated Mar. 30, 2010 (English Translation Thereof).

*Primary Examiner* — Sultan Chowdhury
(74) *Attorney, Agent, or Firm* — McGinn IP Law Group, PLLC

(57) ABSTRACT

The lens shifting device includes: first plate through which video light passes; second plate connected to first plate via elastic member and having projection lens attached to a position into which the video light that passed through first plate enters; slider disposed to project from second plate and housed in first plate to be movable in a predetermined direction; and guide shaft attached to first plate in the state of being engaged with slider and rotated to move the second plate. Elastic member is disposed between first plate and second plate to connect first plate and second plate in the state of generating an elastic contraction force.

4 Claims, 4 Drawing Sheets

(56) References Cited

U.S. PATENT DOCUMENTS

| | | | |
|---|---|---|---|
| 7,164,546 B2* | 1/2007 | Miyashita et al. | 359/813 |
| 7,884,887 B2* | 2/2011 | Yoshimura | 349/5 |
| 8,038,307 B2 | 10/2011 | Kitahara et al. | |
| 2002/0154278 A1* | 10/2002 | Masuda | 353/101 |
| 2005/0030491 A1 | 2/2005 | Gishi | |
| 2005/0117127 A1* | 6/2005 | Jang | 353/100 |
| 2009/0185145 A1* | 7/2009 | Kitahara et al. | 353/101 |
| 2009/0219505 A1 | 9/2009 | Kitahara et al. | |
| 2013/0208250 A1* | 8/2013 | Fujisaki et al. | 353/101 |

* cited by examiner

LENS SHIFTING DEVICE AND PROJECTION DISPLAY DEVICE INCLUDING THE SAME

TECHNICAL FIELD

The present invention relates to a lens shifting device for moving a projection lens, and a projection display device including the same.

BACKGROUND ART

The projection display device includes an optical unit that generates a video according to a video signal, and a projection lens for magnifying and projecting the video.

Recently, the projection display device further includes a lens shifting device that moves the projection lens in a predetermined direction intersecting an optical axis (hereinafter, referred to as video optical axis) where the projected video generated by the optical unit advances. Moving the projection lens enables movement of the projected video on a screen without moving the projection display device and reduction of formation of the projected video into a trapezoidal shape.

By keeping constant the angle between the video optical axis and the center axis of the projection lens during movement of the projection lens, the video is projected to the screen without any distortion. Thus, there has been offered a lens shifting device that smoothly moves the projection lens in astute where the angle between the video optical axis and the center axis of the projection lens is kept constant.

JP2007-33591A (hereinafter, referred to as Patent Literature 1) discloses a lens shifting device that includes a pair of guide shafts arranged on both sides of a projection lens and a plate including sliders corresponding to the guide shafts. The projection lens is fixed to the plate, and the plate moves along the guide shafts. By arranging the guide shafts on both sides of the projection lens with high positional accuracy in relation to the video optical axis, the positional accuracy between the center axis of the projection lens and the video optical axis is maintained, and the video can be projected to the screen without any distortion.

JP2003-315916A (hereinafter, referred to as Patent Literature 2) discloses a lens shifting device where the guide shafts of the lens shifting device disclosed in Patent Literature 1 are replaced with roller support mechanisms having rollers. Sliders are moved along the roller support mechanisms via the rollers, and accordingly sliding frictions between the sliders and the roller support mechanisms can be reduced.

JP2008-287292A (hereinafter, referred to as Patent Literature 3) discloses a lens shifting device that further includes a base brought into contact with the plate, and that presses the plate to the base by using the extension force of an elastic member such as a spring. The optical unit is fixed to the base. By pressing the base and the plate into contact with each other, the positional accuracy between the center axis of the projection lens and the video optical axis is kept, and the video can be projected to the screen without any distortion.

However, in the lens shifting device disclosed in Patent Literature 1 or Patent Literature 2, when the heavy projection lens is fixed to the plate, the guide shafts or the roller support mechanisms may be curved. As a result, the positional accuracy between the center axis of the projection lens and the video optical axis or the slidability of the sliders may deteriorate. To improve the rigidity of the guide shafts or the roller support mechanisms, the diameters of the guide shafts or the sizes of the roller support mechanisms must be increased. This creates a problem in which the size and weight of the lens shifting device increase.

A gap between the guide shaft or the roller support mechanism and the slider affects the positional accuracy between the center axis of the projection lens and the video optical axis and the sliding friction during movement of the plate. Processing accuracy is required for the guide shaft or the roller support mechanism, which increases costs.

Further, when a metal is used for the guide shaft in view of slidability and processing accuracy, due to heat generated by the use of the projection display device, thermal expansion or thermal contraction easily occurs in the guide shaft or the roller support mechanism. As a result, the gap between the guide shaft or the roller support mechanism and the slider changes, creating a problem in which there would be a reduction in positional accuracy or slidability.

In the lens shifting device disclosed in Patent Literature 3, by pressing the plate into contact with the base, the positional accuracy between the center axis of the projection lens and the video optical axis is kept. Thus, no improvement in accuracy is required for the gap between the guide shaft or the roller support mechanism and the slider. Further, since the plate is pressed to the base, there is no need to increase the rigidity of the guide shaft or the roller support mechanism. As a result, the lens shifting device can be constructed compact and lightweight.

However, in Patent Literature 3, the plate is pressed to the base by using the extension force of the elastic member. This generates sliding friction both between the plate and the base and between the plate and the elastic member, creating the possibility of a reduction in slidability. Slide contact members may be arranged both between the plate and the base and between the plate and the elastic member to achieve smooth sliding. However, this increases the number of components of the lens shifting device, consequently increasing the weight and the cost of the lens shifting device.

Further, the plate must be pressed from amide opposite the base by using the elastic member. Consequently, the structure may become complex.

Grease can be applied to the sliding portion to increase slidability. However, the grease may scatter with the temperature increase of the projection display device and may adhere to an optical component disposed in the projection display device. As a result, the quality of the projected video may be greatly reduced.

CITATION LIST

Patent Literature

Patent Literature 1: JP2007-33591A
Patent Literature 2: JP2003-315916A
Patent Literature 3: JP2008-287292A

SUMMARY OF INVENTION

An example of the object of the present invention is to provide a lens shifting device that has a simple structure and a small number of components, is compact and lightweight, and has high positional accuracy and slidability.

To achieve the object, according to an aspect of the present invention, a lens shifting device for moving a projection lens in a predetermined direction intersecting a video optical axis where projected video light advances, includes: a first plate through which the video light passes; a second plate connected to the first plate via an elastic member and having a projection lens attached to a position into which the video light that passed through the first plate enters; a slider disposed to project from the second plate and housed in the first plate to be movable in a predetermined direction; and a guide shaft attached to the first plate in the state of being engaged with the slider and rotated to move the second plate. The elastic member is disposed between the first plate and the second plate to connect the first plate and the second plate in the state of generating an elastic contraction force.

According to the present invention, the lens shifting device has a simple structure and a small number of components, is compact and lightweight, and has high positional accuracy and slidability.

DESCRIPTION OF EMBODIMENTS

Figure 1:
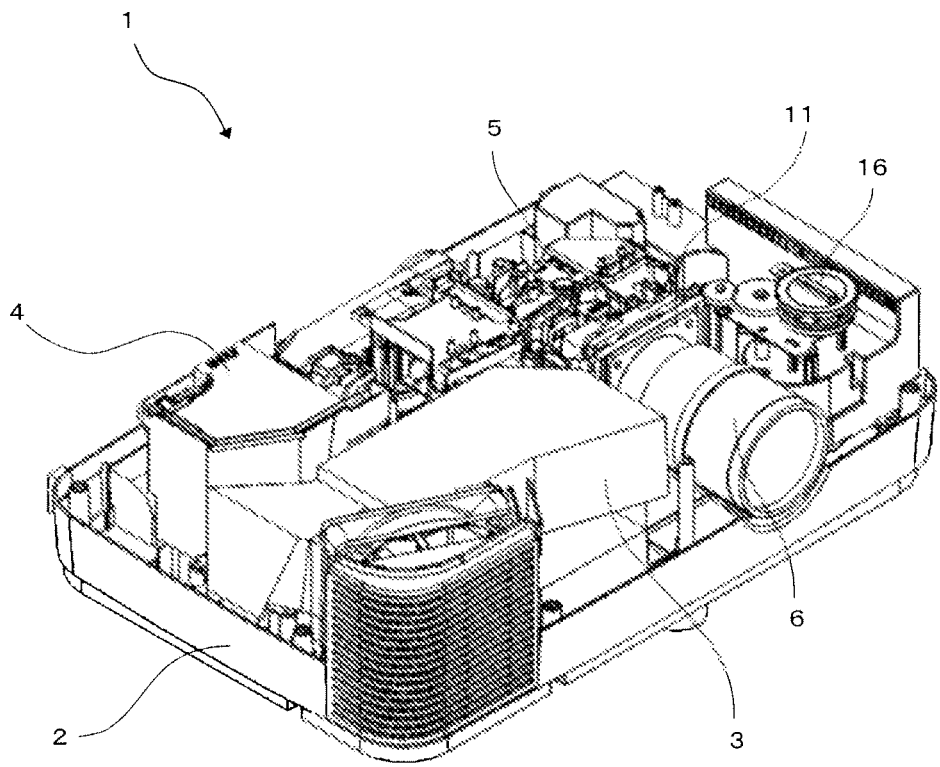
FIG. 1 is a perspective view showing the inside of a projection display device according to the exemplary embodiment of the present invention.

Hereinafter, referring to the drawings, the exemplary embodiment of the present invention is described in detail.

FIG. 1 is a perspective view showing the inside of projection display device 1 according to the exemplary embodiment of the present invention. As shown in FIG. 1, projection display device 1 includes, in lower case 2, power supply unit 3, lamp unit 4, optical engine 5, and projection lens 6. Projection display device 1, in which an internal electronic circuit board (not shown) is mounted, is used in the combined state of lower case 2 and an upper case (not shown).

Figure 2:
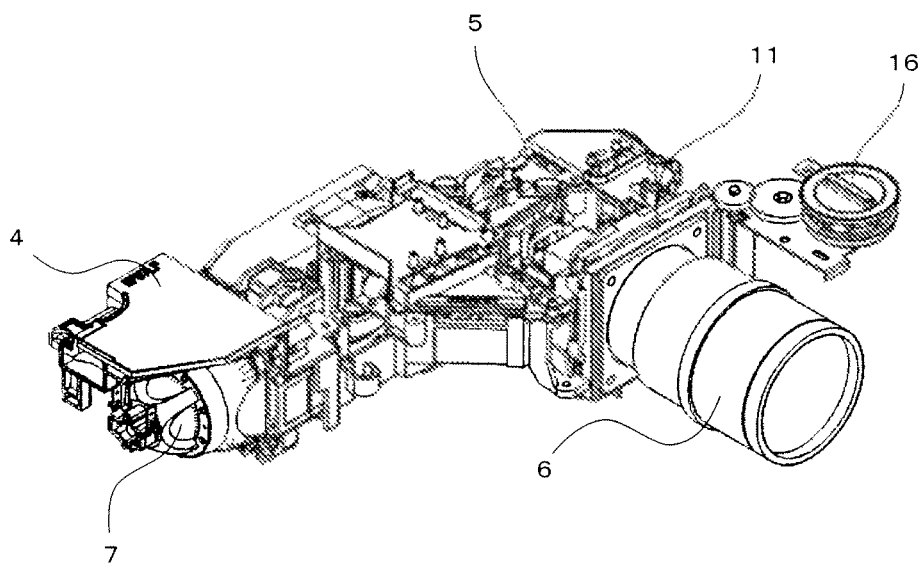
FIG. 2 is an enlarged perspective view of a lamp unit, an optical engine, and a projection lens shown in FIG. 1.

Power supply unit 3 can supply power captured from the outside of projection display device 1 to lamp unit 4 or the internal electronic circuit board. As shown in FIG. 2, lamp unit 4 includes lamp 7 that emits white light. FIG. 2 is an enlarged perspective view of lamp unit 4, optical engine 5, and projection lens 6 shown in FIG. 1.

Optical engine 5 divides the white light into R (red), G (green) and B (blue) lights, generates a video of each color on a liquid crystal panel, and then can synthesize the videos of the respective colors into one video by a cross prism. Projection lens 6 can magnify and project the video.

Figure 3:
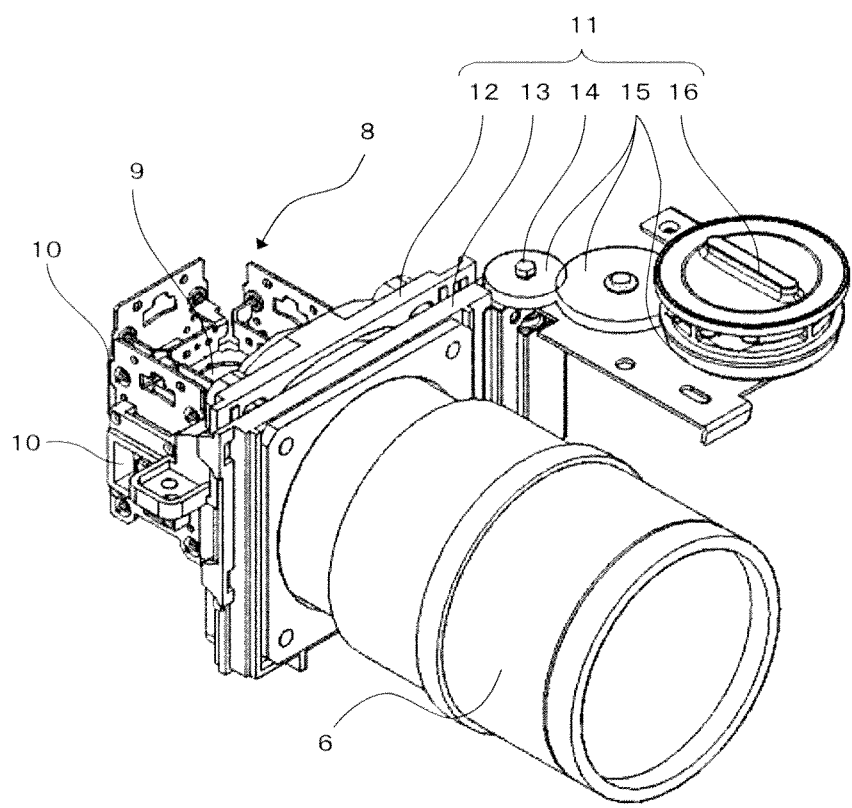
FIG. 3 is an enlarged perspective view of an optical unit and the projection lens shown in FIG. 2.

By activating lamp unit 4, lamp 7 emits white light, and the white light advances toward optical engine 5. The white light is divided into lights of R, G and B, and then enters into optical unit 8 (shown in FIG. 3) located in optical engine 5. FIG. 3 is an enlarged perspective view of optical unit 8 located in optical engine 5 and projection lens 6 shown in FIG. 2.

Optical unit 8 is a collection of optical components such as a polarization plate around liquid crystal panel 10 fixed to cross dichroic prism 9. In this exemplary embodiment, optical unit 8 employs a three-plate liquid crystal type that uses one liquid crystal panel 10 for each of the R, G and B colors.

The lights of the R, G and B colors respectively enter corresponding liquid crystal panels. In the respective liquid crystal panels, videos of R, G and B lights are generated according to a video signal. Then, the videos are synthesized into one video by cross dichroic prism 9. The synthesized video is projected to the screen in a magnified state via projection lens 6.

As shown in FIG. 3, between optical unit 8 and projection lens 6, there is disposed lens shifting device 11 that moves the projection lens in a predetermined direction intersecting a video optical axis. Moving projection lens 6 by using lens shifting device 11 enables movement of the projected video without moving projection display device 1.

Lens shifting device 11 includes first plate 12 through which projected video light passes, and second plate 13 having projection lens 6 attached to a position into which the projected video light that passed through first plate 12 enters. First plate 12 and second plate 13 are arranged to face each other, and optical unit 8 is attached to the surface of a side opposite the surface of first plate 12 opposite second plate 13.

Second plate 13 is located in parallel with first plate 12, and connected to guide shaft 14 for guiding second plate 13. Guide shaft 14 is further connected to lens shift knob 16 via gear 15. Guide shaft 14 and lens shift knob 16 can directly be fixed together without using gear 15.

Figure 4:
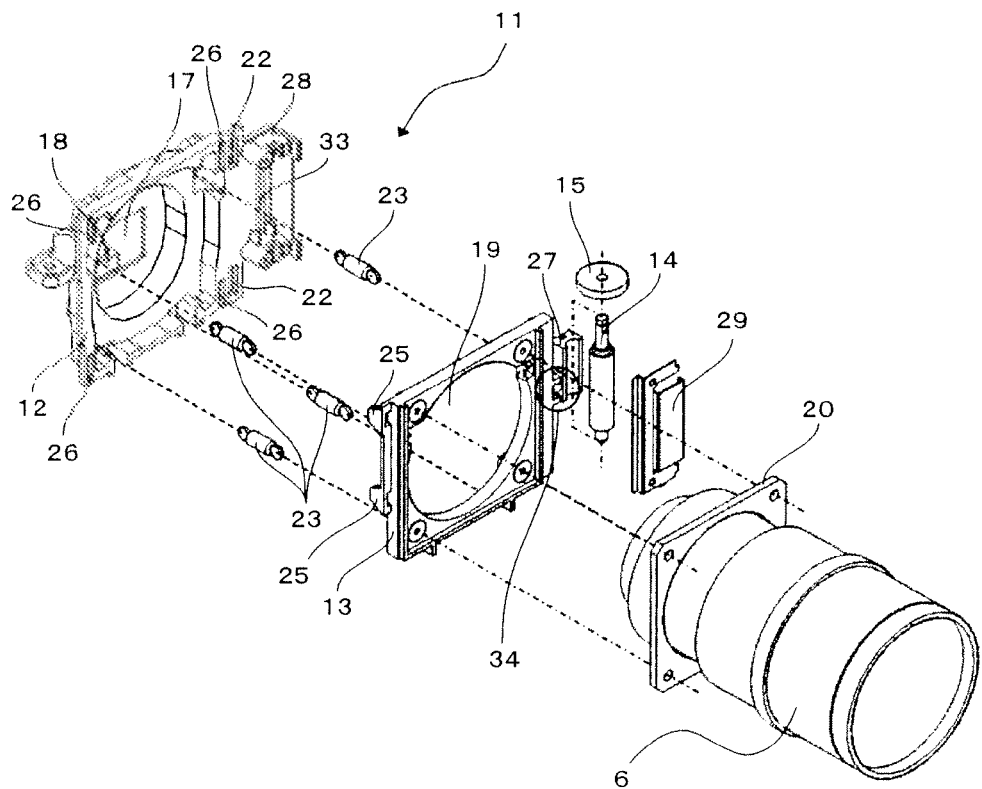
FIG. 4 is an exploded perspective view showing a lens shifting device according to the exemplary embodiment of the present invention.
Figure 5A:
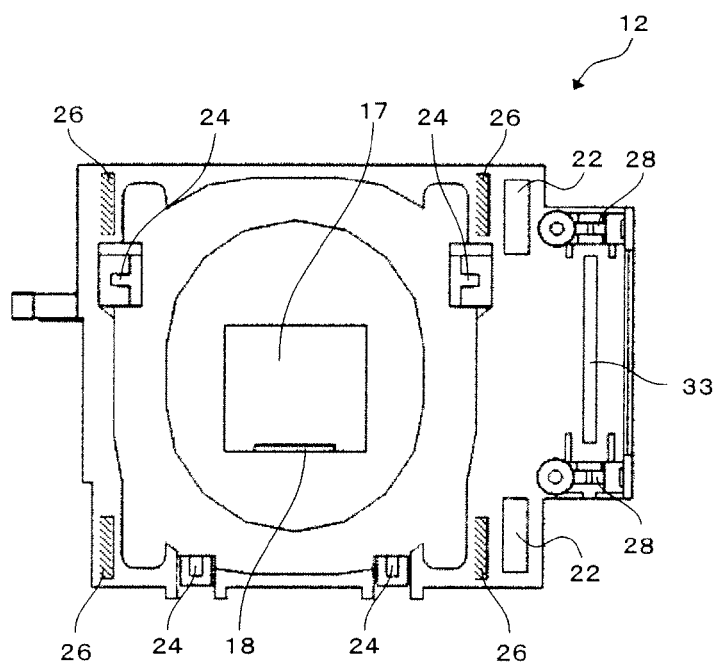
FIG. 5A is a front view of a first plate according to the exemplary embodiment of the present invention.
Figure 5B:
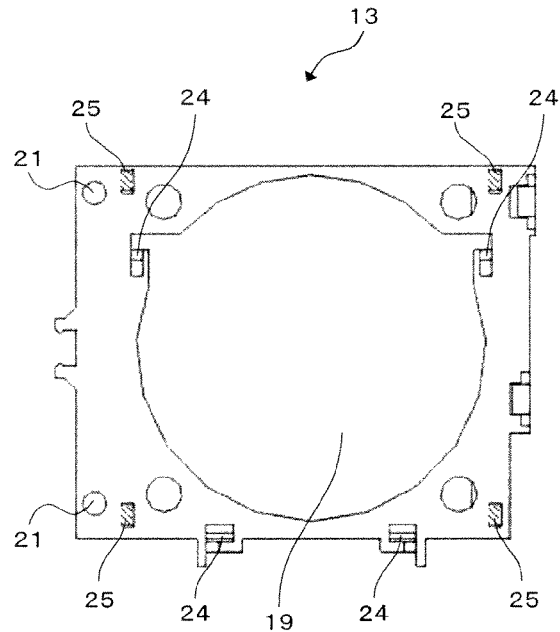
FIG. 5B is a front view of a second plate according to the exemplary embodiment of the present invention.

FIG. 4 is an exploded perspective view showing lens shifting device 11. FIG. 5A is a front view of first plate 12 seen from the surface side opposite second plate 13. FIG. 5B is a front view of second plate 13 seen from the surface side opposite first plate 12.

As shown in FIG. 4 and FIG. 5A, first plate 12 includes hole 17 formed to pass the projected video light. In the surface of the side opposite the surface of first plate 12 opposite second plate 13, optical unit pedestal 8 is disposed to fix optical unit 8. Optical unit pedestal 8 is provided to enable passage of the projected video light that is synthesized by optical unit 8 through hole 17 when optical unit 8 is disposed.

As shown in FIG. 4 and FIG. 5B, second plate 13 includes fitting hole 19 formed to fix the projection lens. Projection lens 6 includes flange 20. Second plate 13 and projection lens 6 are fixed together via flange 20.

In the surface of second plate 13 opposite first plate 12, guide pin 21 is formed to project toward first plate 12 (FIG. 5B). In first plate 12, guide slit 22 is formed to enable insertion of guide pin 21 through first plate 12 when first plate 12 and second plate 13 face each other (FIG. 5A). Guide slit 22 is formed thin and long in the moving direction of second plate 13. Accordingly, guide slit 22 restricts the moving range of second plate 13.

As shown in FIG. 4, second plate 13 is connected to first plate 12 via elastic member 23 having a contraction force and disposed between first plate 12 and second plate 13. As elastic member 23 having the contraction force, an extension coil spring can be used.

As shown in FIG. 5A, in the surface of first plate 12 opposite second plate 13, fixing unit 24 is formed to fix elastic member 23. Similarly, in the surface of second plate 13 opposite first plate 12, fixing unit 24 is formed to fix elastic member 23 (FIG. 5B).

Further, in the surface of second plate 13 opposite first plate 12, projected portion 25 is formed as a guide. The projection length of projected portion 25 is longer than the natural length of elastic member 23.

Thus, before elastic member 23 contracts to its natural length, projected portion 25 and first plate 12 come into contact with each other. Specifically, elastic member 23 connects first plate 12 and second plate 13 together in a state where an elastic contraction force is generated. Second plate 13 is pressed to first plate 12 by the elastic contraction force.

The place of first plate 12 brought into contact with projected portion 25 is referred to as contact surface 26.

Elastic member 23 is connected to first plate 12 and second plate 13 via fixing unit 24. The movement of second plate 13 is accompanied by movement of the end of elastic member 23 fixed to second plate 13. Accordingly, a sliding friction received by second plate 13 becomes a sliding friction between projected portion 25 and contact surface 26.

In this exemplary embodiment, the leading end of projected portion 25 is formed into a planar shape to prevent abrasion caused by friction. The sliding friction between projected portion 25 and contact surface 26 can be reduced depending on the shape of projected portion 25. For example, by forming the leading end of projected portion 25 into a curved surface, contact between projected portion 25 and contact surface 26 becomes linear contact, thus enabling reduction of the sliding friction between projected portion 25 and contact surface 26. By forming the leading end of the projected portion into a spherical surface, contact between projected portion 25 and contact surface 26 becomes point contact, thus enabling further reduction of the sliding friction between projected portion 25 and contact surface 26.

In this exemplary embodiment, projected portion 25 is formed in second plate 13, and contact surface 26 is formed in first plate 12. Needless to say, however, projected portion 25 can be formed in first plate 12, and contact surface 26 can be formed in second plate 13.

To cause elastic member 23 to constantly generate elastic contraction forces, it is only necessary to set an interval between fixing unit 24 of first plate 12 and fixing unit 24 of second plate 13 to be larger than the natural length of elastic member 23. Specifically, there is available a method for forming fixing unit 24 in the concave portion of first plate 12 or second plate 13, and for setting a large interval between fixing units 24. Forming fixing unit 24 in the concave portion enables reduction of the projection length of projected portion 25. Accordingly, the interval between first plate 12 and second plate 13 can be reduced, and lens shifting device 11 can be miniaturized.

Next, the structure of moving second plate 13 is described. Second plate 13 is moved by converting the rotational motion of guide shaft 14 into linear motion by slider 27 (FIG. 4) formed to project from second plate 13. Slider 27 is housed in first plate 12 to be movable in the moving direction of second plate 13.

Figure 6:
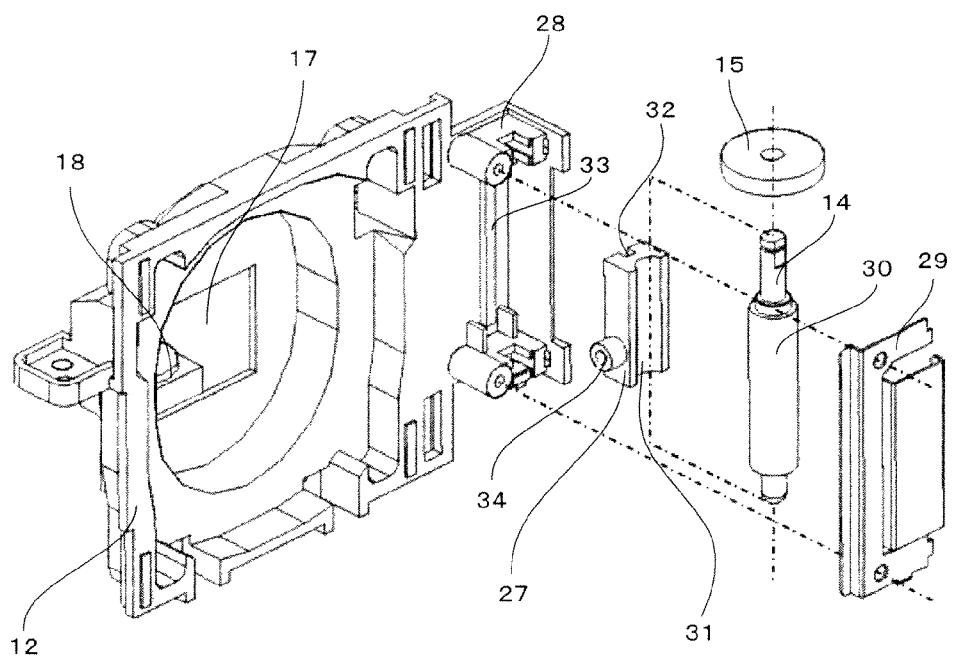
FIG. 6 is an explanatory exploded perspective view showing the moving method of a slider shown in FIG. 4.

FIG. 6 is an explanatory exploded perspective view showing the moving method of slider 27. As shown in FIG. 6, guide shaft 14 is attached to be rotatable by rotational bearing 28 disposed in first plate 12 and separately prepared rotational axis pressing plate 29.

Male screw 30 is formed in a part of the outer circumference of guide shaft 14, and rotational bearing 18 holds both ends of guide shaft 14 where no male screw 30 is formed. Female screw 31 corresponding to male screw 30 is formed in one surface of slider 27. Guide shaft 14 is attached to first plate 12 in the engaged state of female screw 31 and male screw 30 of slider 27.

Thus, by rotating guide shaft 14, rotational motion is transmitted from male screw 30 to female screw 31. According to the rotation of guide shaft 14, slider 27 and second plate 13 move.

In this exemplary embodiment, in the contact surface of slider 27 with first plate 12, groove 32 is formed in parallel with guide shaft 14. In the contact place of first plate 12 with slider 27, rod-shaped projection 33 that fits in groove 32 is formed in parallel with guide shaft 14. Accordingly, slider 27 makes linear motion along rod-shaped projection 33. By fitting rod-shaped projection 33 in groove 32, the moving direction of slider 27 can be restricted.

Slider 27 is coupled with second plate 13 at second plate coupling unit 34. Accordingly, the movement of slider 27 is accompanied by the movement of second plate 13. Second plate 13 and slider 27 can be formed integrally. The integral formation eliminates loosening of the connection between second plate 13 and slider 27 at second plate coupling unit 34. Thus, response of second plate 13 to the movement of slider 27 can be made faster.

In lens shifting device 11 according to the present invention, the positional accuracy of the video optical axis and the center axis of projection lens 6 is maintained by pressing second plate 13 to come into contact with first plate 12. Thus, there is no need to form a gap between guide shaft 14 and slider 27 with high accuracy, and costs can be suppressed.

Even when the temperature of projection display device 1 increases to generate thermal expansion or thermal contraction in guide shaft 14 or slider 27, since the gap between guide shaft 14 and slider 27 is comparatively large, slidability is not reduced.

Further, first plate 12 and second plate 13 can be formed thin in the direction of the video optical axis. Even when the temperature of projection display device 1 increases, since first plate 12 and second plate 13 are thin, size changes caused by thermal expansion or the thermal contraction are small. Thus, reduction in the positional accuracy between the video optical axis and the center axis of projection lens 6 caused by the temperature of projection display device 1 can be prevented.

The use of materials having relatively small linear expansion coefficients for first plate 12 and second plate 13 enables further reduction of size changes of first plate 12 and second plate 13 caused the thermal expansion or thermal contraction. As a result, reduction in the positional accuracy between the video optical axis and the center axis of projection lens 6 caused by the temperature of projection display device 1 can be further prevented.

As materials having relatively small linear expansion coefficients, resin materials can be used. First plate 2 and second plate 13 can be made of the same materials. When first plate 2 and second plate 13 can be made of the same materials, the size changes of first plate 12 and second plate 13 caused by thermal expansion or thermal contraction become approximately equal, and reduction in the positional accuracy between the video optical axis and the center axis of projection lens 6 can be lowered.

Second plate 13 is held by guide shaft 14 and slider 27. In addition, second plate 13 is more firmly held because elastic member 23 pushes second plate 13 against first plate 12. Thus, even when heavy projection lens 6 is fixed to second plate 13, to increase rigidity, there is no need to enlarge the diameter of guide shaft 14, and lens shifting device 11 can be miniaturized and reduced in weight.

Second plate 13 is pressed to first plate 12 by the contraction force of elastic member 23. Accordingly, no elastic member 23 is necessary on the side of second plate 13 opposite first plate 12, thus achieving a simple structure.

Elastic member 23 generates contraction force by engagement with second plate 13. Accordingly, no sliding friction occurs between second plate 13 and elastic member 23, causing no reduction in the slidability of second plate 13. There is no need to dispose any slide contact member for smooth sliding between second plate 13 and elastic member 23, nor is the number of components of lens shifting device 11 increased. As a result, increases in the weight and the costs of lens shifting device 11 can be prevented.

Setting the contact between projected portion 25 and contact surface 26 to be linear contact or point contact enables reduction in the sliding friction between projected portion 25 and contact surface 26. Needless to say, a highly slidable material can be held between projected portion 25 and contact surface 26 to increase slidability. The increased slidability between projected portion 25 and contact surface 26 can reduce force necessary for moving second plate 13, and can improve reliability of lens shifting device 11 for long-time use.

The moving direction of projection lens 6 can be arbitrarily determined based on the arranging direction of guide shaft 14.

Further, for example, by arranging a plurality of guide shafts 14 orthogonally in a horizontal direction and a vertical direction, projection lens 6 can be moved in the horizontal direction and the vertical direction. One guide shaft 14 is attached to first plate 12 in the vertical direction, while other guide shaft 14 is attached to second plate 13 in the perpendicular direction. As in the case of connection of second plate 13 to first plate 12, the plate to which projection lens 6 is attached can be connected to second plate 13 via elastic member 23.

Setting the opening width of guide slit 22 equal to the diameter of guide pin enables an increase in the positional accuracy of second plate 13 in relation to guide shaft 14 in the perpendicular direction.

According to the present invention, lens shifting device 11 has a simple structure and a small number of components, is compact and lightweight, and has high positional accuracy and slidability.

The present invention has been described by way of embodiment. However, the present invention is not limited to the embodiment. Various changes understandable to those skilled in the art can be made to the configuration and the specifics of the present invention within the technical ideas of the invention.

REFERENCE NUMERALS

1 Projection display device
2 Lower case
3 Power supply unit
4 Lamp unit
5 Optical engine
6 Projection lens
8 Optical unit
11 Lens shifting device
12 First plate
13 Second plate
14 Guide shaft
16 Lens shift knob
21 Guide pin
22 Guide slit
23 Elastic member
27 Slider

The invention claimed is:

1. A lens shifting device, comprising:
a first plate through which projected video light passes;
a second plate connected to the first plate via an elastic member and having a projection lens attached to a position into which the projected video light that passed through the first plate enters;
a slider disposed in the second plate and housed in the first plate to be movable in a predetermined direction intersecting a video optical axis where the projected video light advances; and
a guide shaft attached to the first plate in a state of being engaged with the slider to move the second plate according to rotation,
wherein the elastic member is disposed between the first plate and the second plate to connect the first plate and the second plate in a state of generating an elastic contraction force, and
wherein the lens shifting device further comprises:
a guide pin disposed in the second plate to project toward the first plate; and
a guide slit formed in the first plate to be long and thin in the predetermined direction, through which the guide pin is inserted when the first plate and the second plate are connected.

2. The lens shifting device according to claim 1, further comprising a projected portion formed in the second plate to be brought into contact with the first plate when the first plate and the second plate are connected, wherein the projection length of the projected portion is longer than the natural length of the elastic member.

3. A projection display device comprising the lens shifting device according to claim 1.

4. A projection display device comprising the lens shifting device according to claim 2.

* * * * *